(12) United States Patent
Lee et al.

(10) Patent No.: US 6,294,083 B1
(45) Date of Patent: *Sep. 25, 2001

(54) SUMP COVERING FILTER WITH BYPASS VALVE

(76) Inventors: Brian Thomas Lee, 4015 Canterbrook Dr., Charlotte, NC (US) 28269; Edward Allen Covington, 4153 Graceway Dr., Gastonia, NC (US) 28052

( * ) Notice: Subject to any disclaimer, the term of this patent is extended or adjusted under 35 U.S.C. 154(b) by 0 days.

This patent is subject to a terminal disclaimer.

(21) Appl. No.: 09/474,064

(22) Filed: Dec. 29, 1999

(51) Int. Cl.[7] .................................................. B01D 27/10
(52) U.S. Cl. ...................... 210/130; 210/168; 210/171; 210/416.5; 210/434; 210/172
(58) Field of Search ..................... 210/130, 136, 210/168, 171, 172, 416.5, 433.1, 434, 474, 477

(56) References Cited

U.S. PATENT DOCUMENTS

| | | | |
|---|---|---|---|
| 1,230,470 | 6/1917 | Farmer . | |
| 2,192,438 | * 3/1940 | Gulick | 210/168 |
| 4,261,838 | * 4/1981 | Halleron | 210/168 |
| 4,352,737 | * 10/1982 | Taniguchi | 210/168 |
| 4,898,207 | 2/1990 | Ueki et al. . | |
| 4,915,852 | 4/1990 | Tomlinson . | |
| 5,130,014 | * 7/1992 | Volz | 210/172 |
| 5,339,776 | 8/1994 | Regueiro . | |
| 5,589,059 | * 12/1996 | Semar | 210/136 |
| 5,863,424 | * 1/1999 | Lee | 210/168 |
| 6,013,179 | 1/2000 | Laughlin et al. . | |

* cited by examiner

*Primary Examiner*—Christopher Upton
(74) *Attorney, Agent, or Firm*—Millen, White, Zelano & Branigan, P.C.

(57) ABSTRACT

A sump pan for a device such as a transmission or engine lubricating system includes an upper chamber and a lower chamber which are separated by a partition. The partition has an opening therethrough in which a filter media is positioned for filtering dirty fluid in the upper chamber so that clean fluid collects in the lower chamber. A suction tube extends through the partition for pulling the clean fluid for recirculation through the device utilizing the fluid such as a transmission or an engine. A bypass valve is also disposed in the partition so that if the fluid becomes too viscous to pass through the filter media, or the filter media becomes clogged, the bypass valve will open so that the fluid can still circulate.

6 Claims, 2 Drawing Sheets

SUMP COVERING FILTER WITH BYPASS VALVE

FIELD OF THE INVENTION

The present invention is directed to sump covering filters which include bypass valves. More particularly, the present invention is directed to a sump covering filter with a bypass valve for filtering liquids such as transmission fluid and lubricating oil.

BACKGROUND OF THE INVENTION

Automatic transmissions experience reduced performance when transmission fluid viscosity is too high due to very cold temperatures because the fluid becomes too viscous or thick to flow readily through the filter media. This results in a reduction in the volume of fluid circulating in the transmission due to increased filter restriction. A reduction in the volume of fluid can starve the pump of transmission fluid so that the shift control valves within the transmission do not operate properly.

In filtering transmission fluid, it is desirable to make the filter media more efficient for removing small particles; however, more efficient filter media tends to increase restriction of fluid flow therethrough which causes flow problems in cold temperature start-ups. Accordingly, there is a need for an arrangement which will allow more efficient filter media for the removal of small particles while not having the drawback of starving transmission pumps of fluid.

Other arrangements may also have these difficulties. For example, lubricating oil used in internal combustion engines may be filtered by filters associated with the lubricating oil pan as opposed to spin-on type filters. At extremely low temperatures, the lubricating oil may so increase in viscosity that it does not pass readily through the filter media and thus the engine associated therewith may be starved of lubricating oil. In addition, lubricating oil filters tend to become clogged and need periodic replacement at intervals usually quite shorter than the intervals for transmission filters. Consequently, if these filters become clogged, there is a need to by-pass the filters as is done with spin-on type oil filters.

While transmissions, such as automatic transmissions and other transmission which utilize oil, and internal combustion engines which utilize lubricating oil, are of primary interest with respect to circulating fluid which has become viscous, there are other types of machinery in which operating or lubricating oil is filtered and in which either cold temperatures or clogged filters result in inefficient or improper operation of the machine. Accordingly, there is a need for arrangements which generally address this problem.

SUMMARY OF THE INVENTION

In view of the aforementioned problems and other problems, it is a feature of the present invention to provide a new and improved arrangement for sump covering filters in which a filter media is by-passed when fluid which normally circulates through the filter media is prevented from doing so efficiently.

In view of this feature and other features, the present invention is directed to an arrangement for filtering a circulating fluid wherein the fluid has a viscosity which varies with temperature and wherein the fluid accumulates in and is pumped from a sump pan. The sump pan has side walls in the bottom wall which are divided by a partition into an upper chamber and lower chamber. The partition has an opening therethrough in which a filter media is positioned so as to filter fluid flowing from the upper chamber through the opening into the lower chamber. A suction tube has a first open end within the lower chamber and a second end which is adapted for connection to a suction pump. A bypass valve is disposed between the upper chamber of the sump pan and the pump to which the suction tube is adapted to connect. The bypass valve opens to allow the fluid to bypass the filter when the viscosity of the fluid is elevated.

In a more specific aspect of the invention, the bypass valve is disposed in the partition.

In still a more specific aspect of the invention, the suction tube as well as the bypass valve are disposed in the partition and the partition is separable from the pan to facilitate assembly and maintenance of the arrangement.

In accordance with one aspect of the invention, the arrangement is used for filtering transmission fluid, and in accordance with another embodiment, the arrangement is utilized to filter lubricating oil.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts through the several views, and wherein.

DETAILED DESCRIPTION

Figure 1:
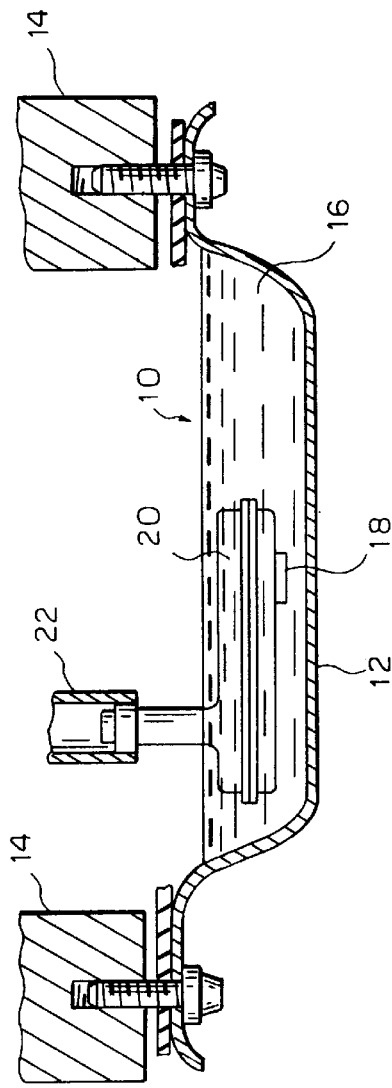
FIG. 1 is side elevation of a sump filtering arrangement in accordance with the present invention illustrating normal operation thereof.

Referring now to FIG. 1, there is shown an arrangement 10 for filtering a circulating fluid 12, which circulating fluid has a viscosity which varies with temperature. In accordance with one embodiment of the invention, the circulating fluid 12 is transmission fluid which may be utilized with an automatic transmission or a semi-automatic transmission. When the transmission fluid 12 is at ordinary operating temperatures, it flows readily through a filter media 14 from an upper chamber 16 into a lower chamber 18 of a sump pan 20. From the lower chamber 18, the transmission fluid 12 is pulled through a suction tube 22 by a transmission pump 24 that delivers the transmission fluid to a transmission (not shown).

Considering the structure of the arrangement 10 more specifically, dirty transmission fluid 12a having particulate matter therein accumulates in the upper chamber 16 and must pass through the filter media 14 in order to remove the particulates therefrom so that clean transmission fluid 12b pools in the lower chamber 18. The filter element 14 is preferably a pleated filter element which may be made of cellulose or other filter media such as, for example, spun polyester. The suction tube 22 has a first end 26 which is open within the lower chamber 18 and a second end 28 which is connected to the pump 24.

In accordance with a preferred embodiment of the invention, the sump pan 20 has side walls 30 and a bottom wall 32 with the side walls 30 having a peripheral flange 34 therearound, which is bolted to a transmission case 36 by bolts 38. A partition 40 is disposed within the sump pan 20 and preferably includes unitary therewith or integral therewith, the suction tube 22 and a frame 42 which surrounds the opening 13 in which the filter media 14 is disposed. The partition 40 has a peripheral flange 44 which is sandwiched between the transmission case 36 and the peripheral flange 34 of the sump pan 20 so as to be retained in place by the bolts 38. When it is necessary or desired to change the filter media 14, the partition 40 is removed from the assembly of the arrangement 10 by removing the bolts 38 (or nuts, if the bolts are integral with the transmission case 36) so as to separate the sump pan 20 from the partition 40. A new partition 40 with the filter media 14 and suction tube 22 affixed thereon is then substituted for the used partition 40 and the arrangement 10 reassembled as is shown in FIG. 1.

In an alternative embodiment, the partition 14 is integral or unitary with the suction pan 20 and the entire filtering arrangement 10 is replaced.

Figure 2:
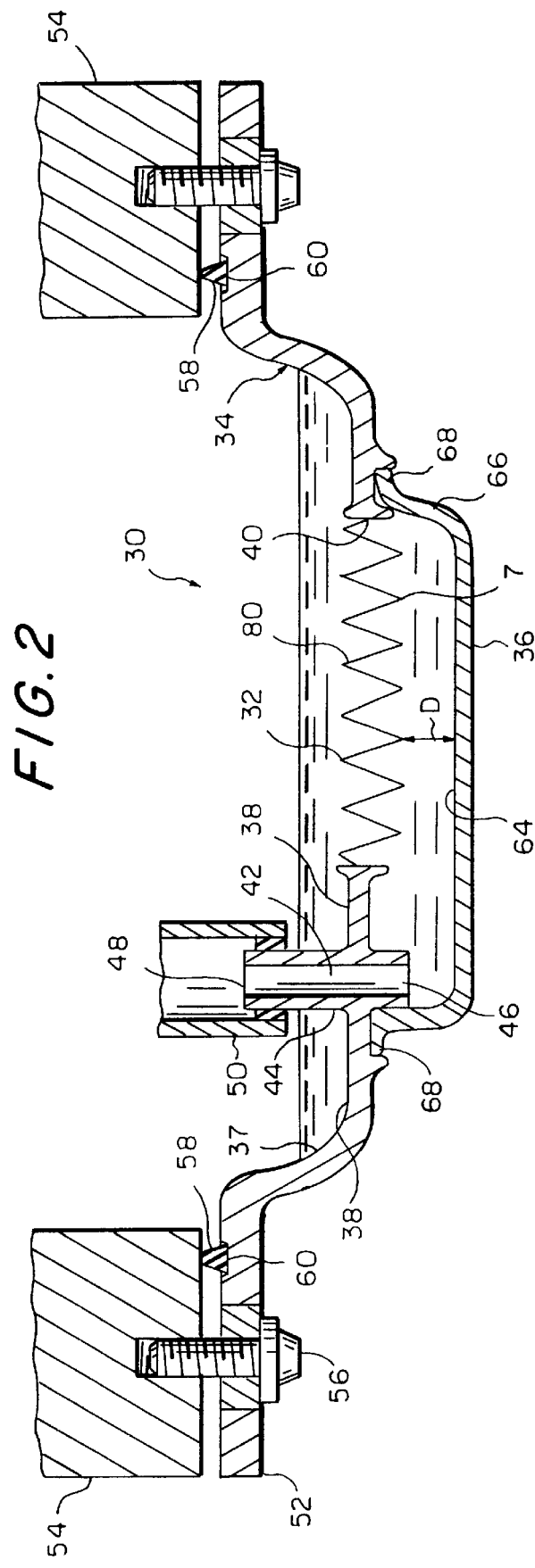
FIG. 2 is a view of a valve used in the arrangement of FIG. 2 showing the valve in a closed position.
Figure 4:
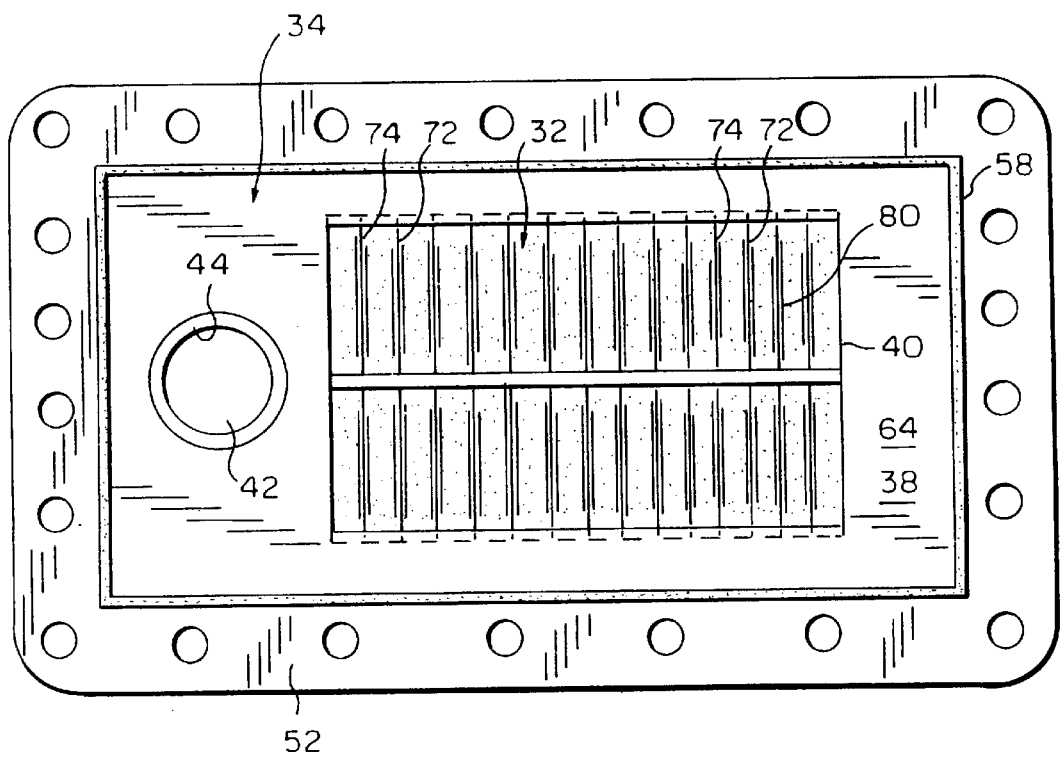
FIG. 4 is a side elevation similar to FIG. 2 but showing the valve in an open position during high restriction operation shown in FIG. 3.
Figure 1:
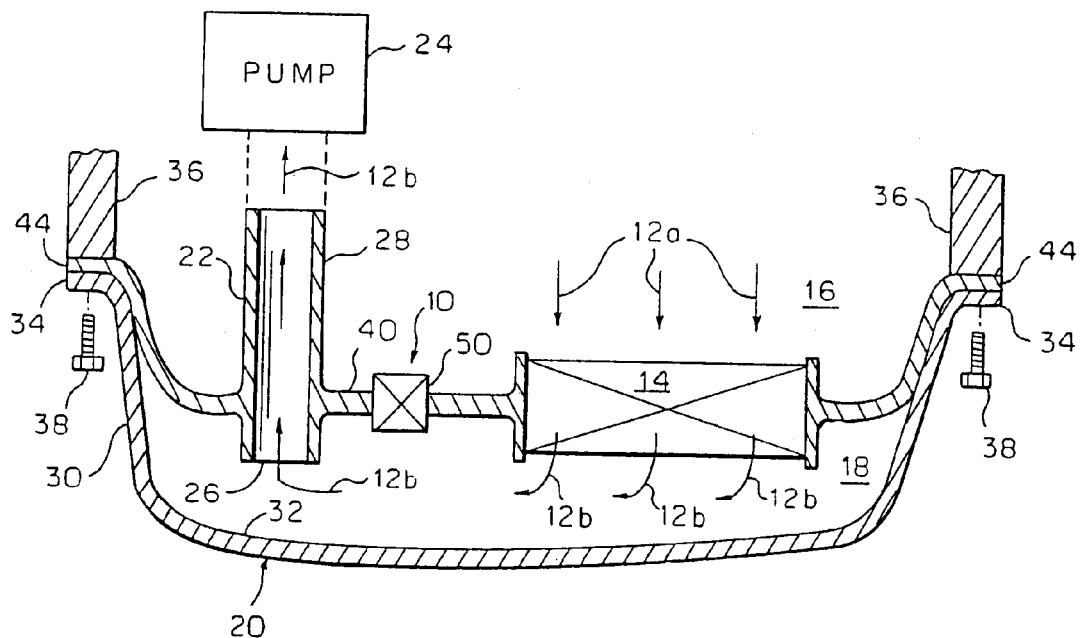
Figure 2:
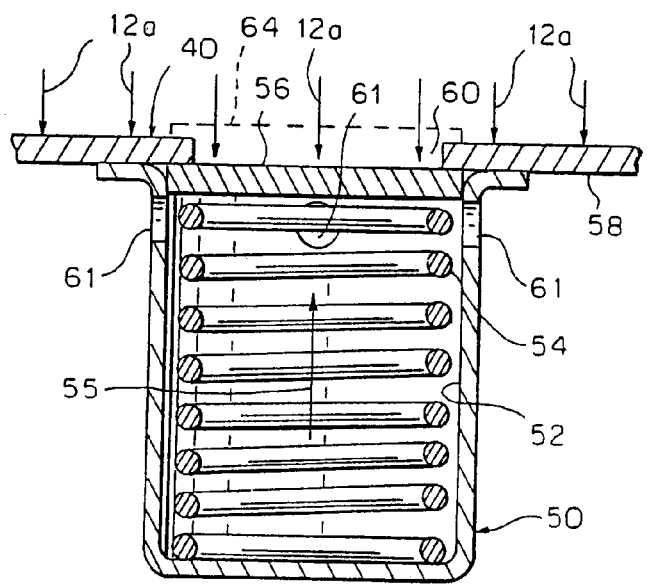
Figure 3:
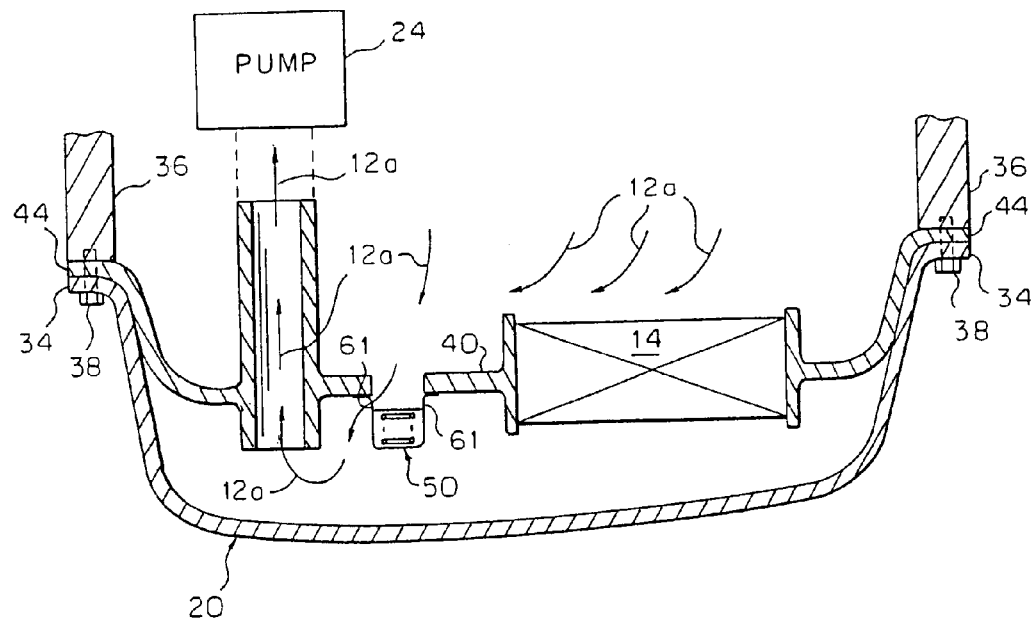
Figure 4:
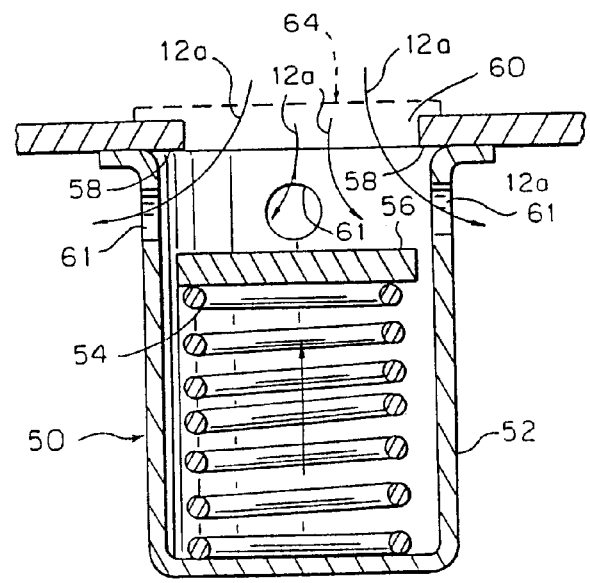

In accordance with present invention, there is a valve 50 disposed in the partition 40, which valve 50 preferably has the configuration shown in FIGS. 2 and 4. During the normal operation shown in FIG. 2, the valve 50 is closed so that dirty transmission fluid 12a flows through the filter media 14 to provide clean transmission fluid 12b for pumping through the transmission by the pump 24.

Figure 3:
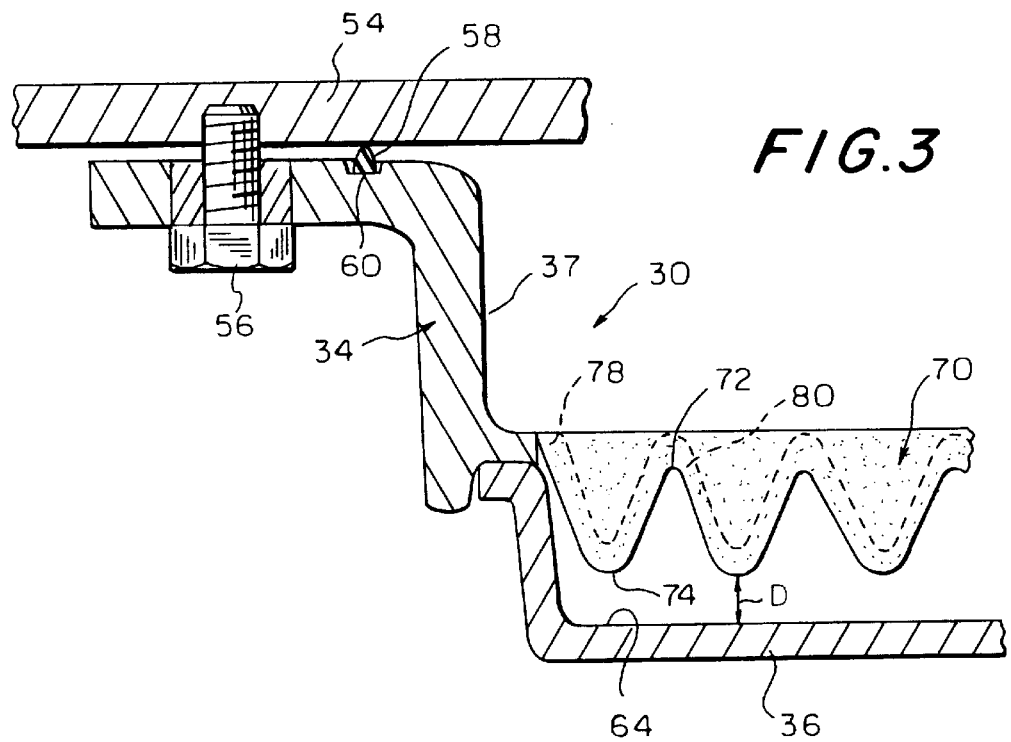
FIG. 3 is a side elevation of the sump filter arrangement as shown in FIG. 1 but showing the operation thereof during high filter restriction.

In the preferred embodiment of FIG. 2 (and FIG. 4) the valve 50 comprises a spring pocket or bracket 52 in which the coil spring 54 is disposed. The coil spring 54 exerts a force 55 which biases a valve element 56 against the bottom surface 58 of the partition 40 so as to close an opening 60 through the partition. As long as the pressure of the dirty fluid 12a does not exceed the pressure exerted against the valve element 56 by the spring 54, the dirty fluid 12a will flow through the filter media 14. However, if the filter media 14 becomes restricted, then the fluid pressure on the valve element 56 will exceed the force exerted by spring 54 and the valve 50 will open as is shown in FIGS. 3 and 4 thus allowing the dirty transmission fluid 12a to bypass the filter media 14 by flowing through openings 61 in the spring pocket 52 as is seen in FIGS. 3 and 4. In order to stop rather large particles which may become entrained in the dirty transmission fluid 12a, a screen 64 is positioned over the opening 60 through the partition 40.

With transmissions (not shown), high restriction occurs in the filter if the transmission fluid 12 is cold enough to increase its viscosity to a level where pressure generated by the pump 24 is not sufficient to push the dirty transmission fluid 12a through the filter media 14. When this occurs, the bias 55 of the spring 54 is overcome and dirty transmission fluid 12a flows into the lower chamber 18 and through the suction tube 24 from which it is pumped by the pump 24 back through the transmission. Accordingly, the transmission is not starved for fluid, which is more likely to damage the transmission than having a paucity of transmission fluid. Moreover, the transmission will continue to run smoothly until the transmission oil is heated by friction developed during its flow. As the viscosity of the fluid 12 decreases, the fluid begins to flow through the filter media 14 and the valve 50 begins to close. Finally, the valve 50 completely closes and all of the dirty fluid 12a passes through the filter 14 into the second chamber 18 to emerge as the clean fluid 12b that is circulated by the pump 24 through the transmission.

By incorporating the bypass valve 50 the filter media 14 can be made more efficient for removal of small particles. Typically, more efficient media 14 will increase restriction of fluid flow, thereby causing the aforedescribed flow problems at cold temperatures. By allowing transmission fluid 12 to flow at extremely cold temperatures, and then closing as the fluid warms, the arrangement 10 allows the use of higher efficiency media.

The valve 50 also opens if the media 14 clogs due to particulate buildup so that the transmission still has fluid and will function with dirty transmission fluid 12a until the partition 40 is changed, which of course may happen during standard maintenance intervals. Optionally, a detector may be associated with the valve 50 to electrically signal a vehicle operator if the valve remains continually open indicating that a new partition 40 with a fresh filter media 14 needs to be installed.

While the illustrated embodiment is directed to a sump arrangement for transmission fluid, the same arrangement may be utilized for filtering other fluids, such as engine lubricating oil, so that the filter media 14 is used instead of, or perhaps in addition to, a spin-on lubricating oil filter. Lubricating oil also becomes viscous at very cold temperatures, (for example −30° F.), so as to not readily flow through filter media such as the filter media 14. By using the present invention, an engine is not starved of lubricating oil during very cold startups. Likewise, if the filter media 14 becomes clogged, then the valve 50 will open and allow the engine to continue being lubricated even if the oil is dirty oil.

From the foregoing description, one skilled in the art can easily ascertain the essential characteristics of this invention and, without departing from the spirit and scope thereof, can make various changes and modifications of the invention to adapt it to various usages and conditions.

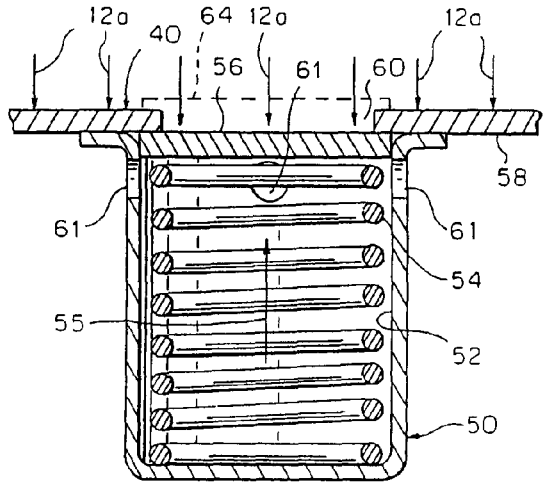

What is claimed is:

1. An arrangement adapted to filter a circulating fluid used in a transmission or a lubricating system of an internal combustion engine, wherein the fluid has a viscosity which varies with temperature and wherein the fluid accumulates in and is pumped from a sump pan having side walls and a bottom wall; the arrangement comprising:

a partition adapted to divide the sump into an upper chamber and a lower chamber, the partition having an opening therethrough wherein liquid in the upper chamber can flow to the lower chamber through the opening;

a filter media disposed in the opening for filtering the liquid as it flows between the upper chamber and lower chamber;

a suction tube having a first open end adapted to be positioned in the lower chamber and a second end adapted to connect to a pump;

a bypass valve disposed in the partition between the upper chamber of the pan and the pump to which the suction tube connects, the bypass valve opening to allow the fluid to bypass the filter when the viscosity of the fluid is elevated, and a peripheral flange around the partition, the peripheral flange having a plurality of spaced apart bolt holes adapted to receive bolts for clamping the partition between the sump pan and the transmission or engine.

2. The arrangement of claim 1, wherein the bypass valve is disposed in the partition.

3. The arrangement of claim 2, wherein the suction tube is disposed in the partition.

4. The arrangement of claim 3, wherein the partition is separable from the pan and is integral therewith when the pan is assembled for use.

5. The arrangement of claim 4, wherein the fluid is transmission fluid, the viscosity of which increases as the temperature thereof decreases and wherein the filter media resists flow of the transmission fluid therethrough at high viscosities of the fluid, the pan having a connection for coupling with a source of transmission fluid.

6. The arrangement of claim 4, wherein the fluid is lubricating oil, the viscosity of which increases as the temperature thereof decreases and wherein the filter media resists flow of the transmission fluid therethrough at high viscosities of the fluid, the pan having a connection for coupling with a source of lubricating fluid.

* * * * *

UNITED STATES PATENT AND TRADEMARK OFFICE
CERTIFICATE OF CORRECTION

PATENT NO.    : 6,294,083 B1
DATED         : September 25, 2001
INVENTOR(S)   : Lee et al.

It is certified that error appears in the above-identified patent and that said Letters Patent is hereby corrected as shown below:

The title page showing an illustrated figure, should be deleted and substituted therefor the attached title page.

Delete drawing sheets 1 & 2, and substitute therefor the attached drawing sheets 1 & 2.

Signed and Sealed this

Ninth Day of September, 2003

JAMES E. ROGAN
*Director of the United States Patent and Trademark Office*

(12) United States Patent
Lee et al.

(10) Patent No.: US 6,294,083 B1
(45) Date of Patent: *Sep. 25, 2001

(54) SUMP COVERING FILTER WITH BYPASS VALVE

(76) Inventors: Brian Thomas Lee, 4015 Canterbrook Dr., Charlotte, NC (US) 28269; Edward Allen Covington, 4153 Graceway Dr., Gastonia, NC (US) 28052

(*) Notice: Subject to any disclaimer, the term of this patent is extended or adjusted under 35 U.S.C. 154(b) by 0 days.

This patent is subject to a terminal disclaimer.

(21) Appl. No.: 09/474,064

(22) Filed: Dec. 29, 1999

(51) Int. Cl.[7] .................................................. B01D 27/10
(52) U.S. Cl. ........................... 210/130; 210/168; 210/171; 210/416.5; 210/434; 210/172
(58) Field of Search ............................ 210/130, 136, 210/168, 171, 172, 416.5, 433.1, 434, 474, 477

(56) References Cited

U.S. PATENT DOCUMENTS

| | | |
|---|---|---|
| 1,230,470 | 6/1917 | Farmer . |
| 2,192,438 * | 3/1940 | Gulick ................................ 210/168 |
| 4,261,838 * | 4/1981 | Halleron ............................. 210/168 |
| 4,352,737 * | 10/1982 | Taniguchi ........................... 210/168 |
| 4,898,207 | 2/1990 | Ueki et al. . |
| 4,915,852 | 4/1990 | Tomlinson . |
| 5,130,014 * | 7/1992 | Volz .................................. 210/172 |
| 5,339,776 | 8/1994 | Regueiro . |
| 5,589,059 * | 12/1996 | Semar ................................ 210/136 |
| 5,863,424 * | 1/1999 | Lee .................................... 210/168 |
| 6,013,179 | 1/2000 | Laughlin et al. . |

* cited by examiner

Primary Examiner—Christopher Upton
(74) Attorney, Agent, or Firm—Millen, White, Zelano & Branigan, P.C.

(57) ABSTRACT

A sump pan for a device such as a transmission or engine lubricating system includes an upper chamber and a lower chamber which are separated by a partition. The partition has an opening therethrough in which a filter media is positioned for filtering dirty fluid in the upper chamber so that clean fluid collects in the lower chamber. A suction tube extends through the partition for pulling the clean fluid for recirculation through the device utilizing the fluid such as a transmission or an engine. A bypass valve is also disposed in the partition so that if the fluid becomes too viscous to pass through the filter media, or the filter media becomes clogged, the bypass valve will open so that the fluid can still circulate.

6 Claims, 2 Drawing Sheets